United States Patent [19]

Robbins et al.

[11] Patent Number: 5,044,271
[45] Date of Patent: Sep. 3, 1991

[54] COMPACTOR DOOR AND INTERLOCK

[75] Inventors: James K. Robbins, Fayette; Brown, Ronald L., Vernon, both of Ala.; Kent Spiers, Caledonia, Miss.

[73] Assignee: Marathon Equipment Company, Vernon, Ala.

[21] Appl. No.: 480,572

[22] Filed: Mar. 29, 1990

[51] Int. Cl.⁵ ............................................ B03B 15/16
[52] U.S. Cl. ..................................... 100/53; 100/218; 100/255
[58] Field of Search ................... 100/53, 218, 245, 255

[56] References Cited

U.S. PATENT DOCUMENTS

| | | | |
|---|---|---|---|
| 3,851,577 | 12/1974 | Newcom et al. | 100/53 X |
| 3,861,297 | 6/1975 | Considine et al. | 100/255 X |
| 3,916,781 | 11/1975 | Cerniglia | 100/53 |
| 3,945,313 | 3/1976 | Komberec et al. | 100/255 X |
| 3,945,314 | 3/1976 | Hennells | 100/53 |
| 4,041,856 | 8/1977 | Fox | 100/255 X |
| 4,182,236 | 1/1980 | Greer | 100/53 X |
| 4,232,599 | 11/1980 | Ulrich | 100/53 X |
| 4,311,092 | 1/1982 | Tea | 100/255 X |
| 4,363,267 | 12/1982 | Greer | 100/255 |
| 4,512,252 | 4/1985 | Goldhammer | 100/53 |

FOREIGN PATENT DOCUMENTS

| | | | |
|---|---|---|---|
| 247139 | 9/1963 | Australia | 100/53 |
| 2516293 | 10/1976 | Fed. Rep. of Germany | 100/53 |
| 2516294 | 10/1976 | Fed. Rep. of Germany | 100/53 |
| 604727 | 7/1948 | United Kingdom | 100/53 |
| 614344 | 12/1948 | United Kingdom | 100/53 |

Primary Examiner—Harvey C. Hornsby
Assistant Examiner—Stephen F. Gerrity
Attorney, Agent, or Firm—Jennings, Carter, Thompson & Veal

[57] ABSTRACT

An improved manually fed waste baling compactor has a single interlock switch which controls movement of a vertically oriented ram and platen such that the ram cannot move unless both a chamber door and a guard door of the mechanism are properly positioned. A magnetic interlock prevents opening the guard door manually until after the compression and retraction stroke of the ram.

14 Claims, 5 Drawing Sheets

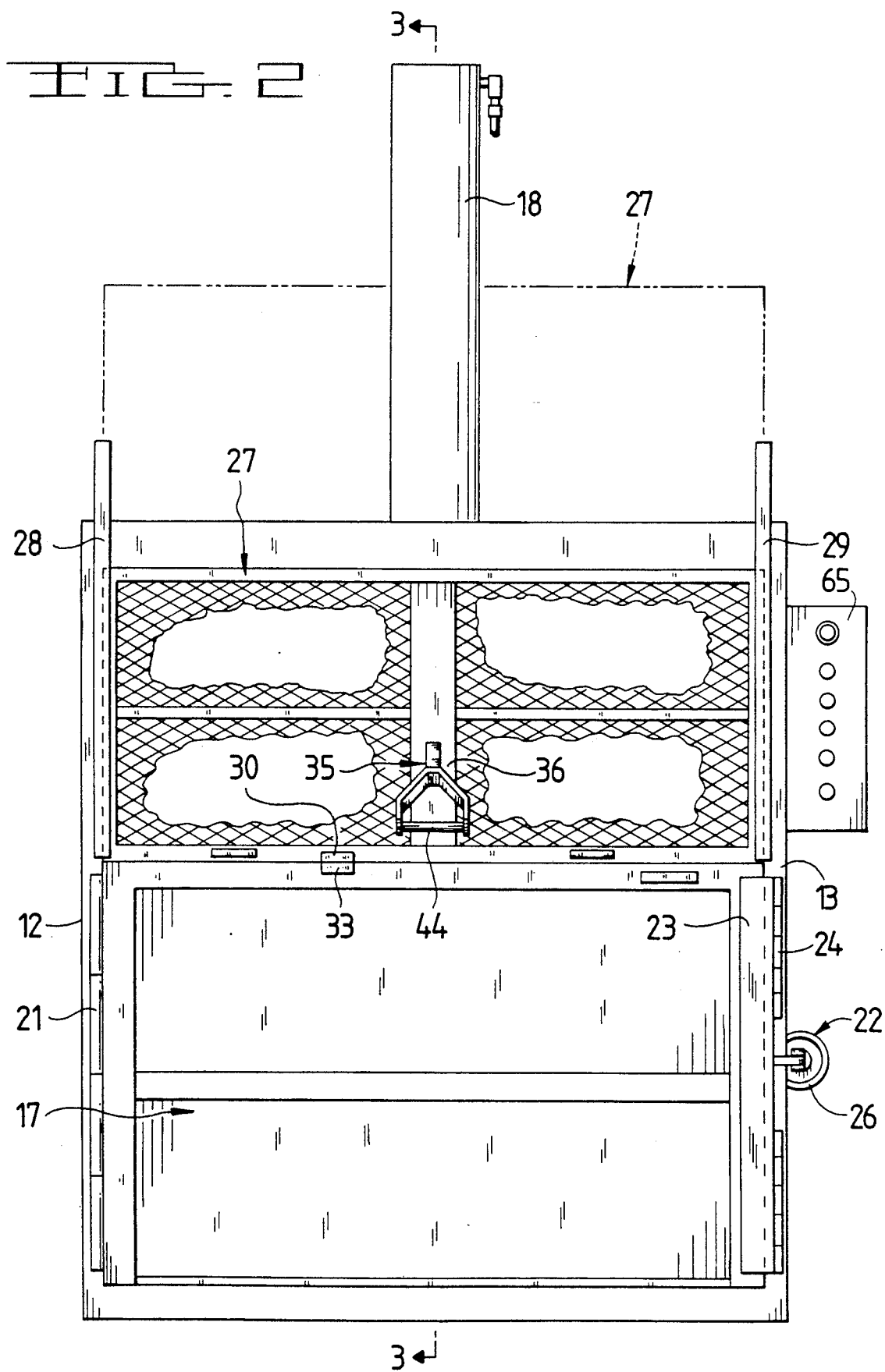

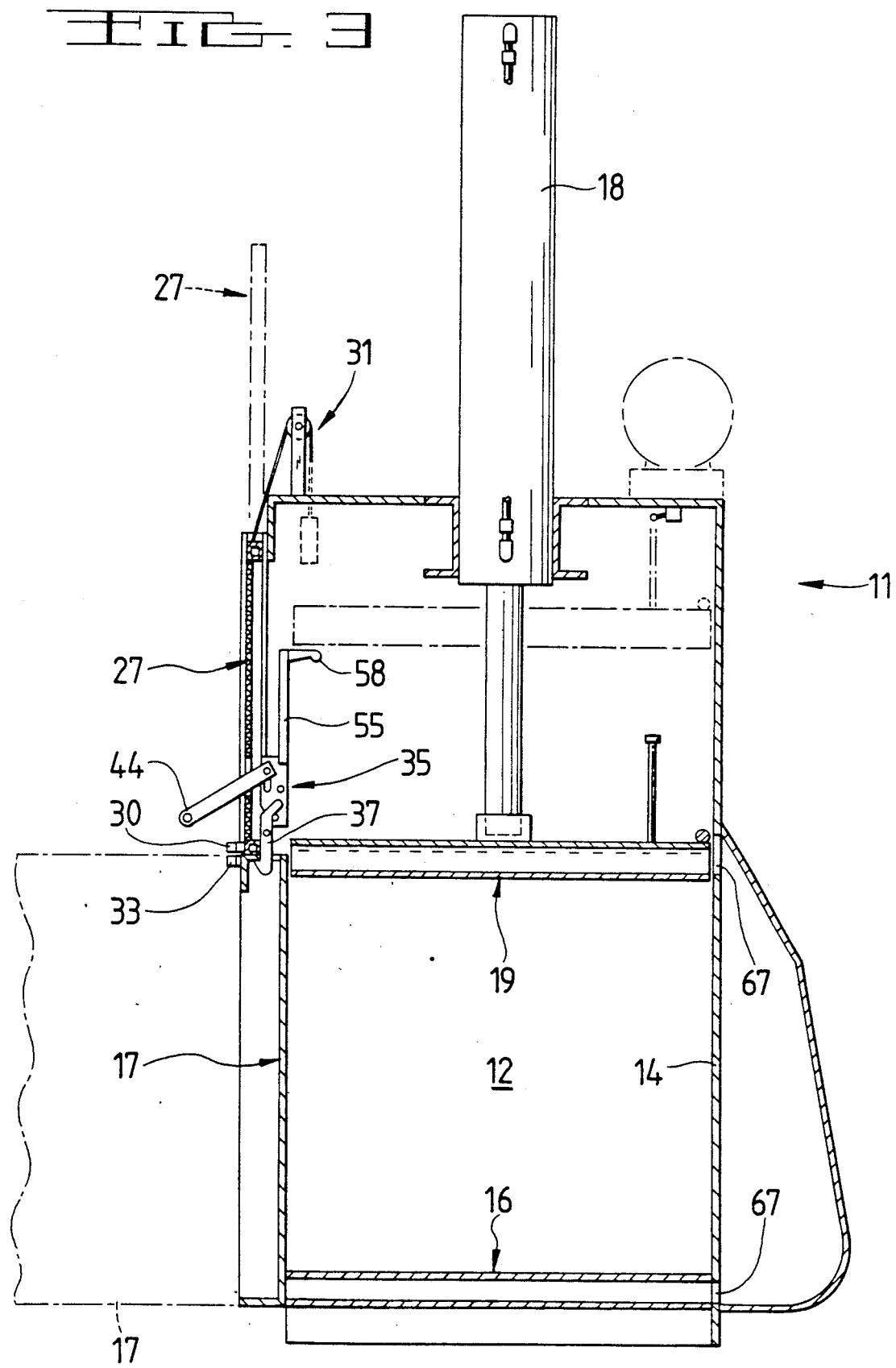

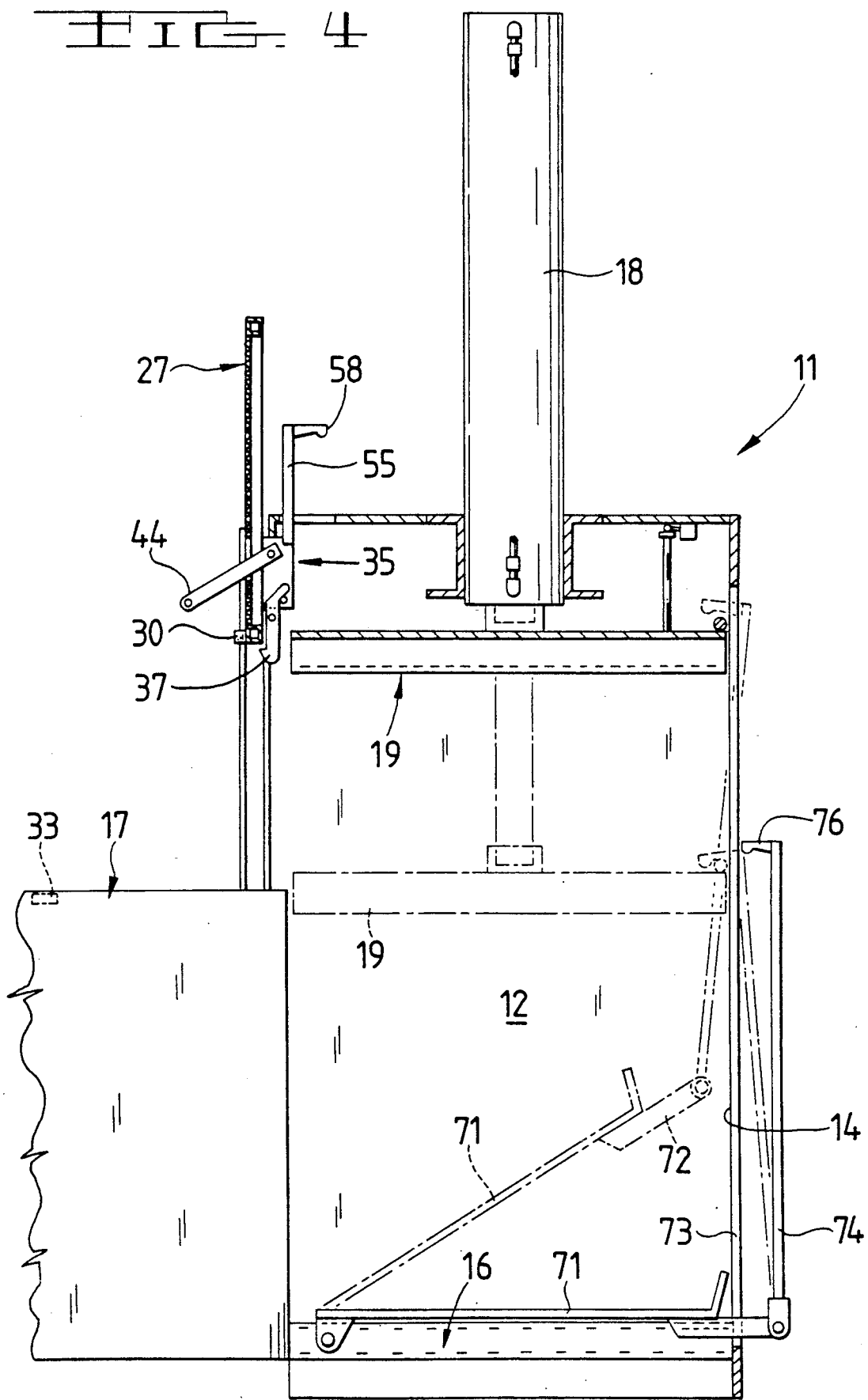

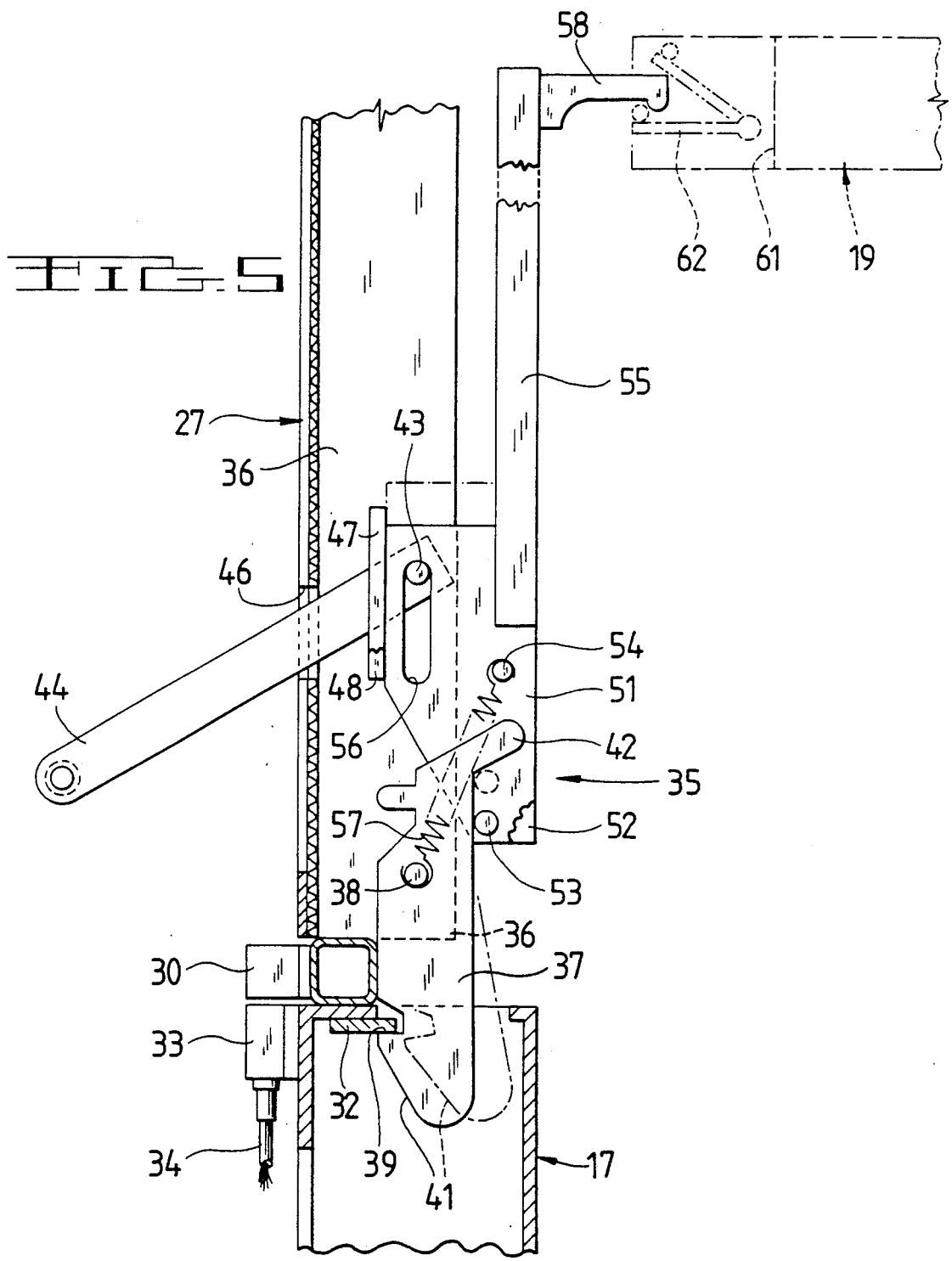

COMPACTOR DOOR AND INTERLOCK

FIELD OF THE INVENTION

The present invention relates to compactors or balers of the type having a vertically reciprocal ram and platen, a hinged discharge door for removal of a compacted bale, and a movable guard door positionable to permit introduction of material into the compactor when the ram is at rest. More particularly, the present invention relates to apparatus of the aforesaid description further including interlocking mechanism to prevent inadvertent operation of the ram or opening of the guard door during operation of the ram.

BACKGROUND OF THE INVENTION

The patent literature is doubtless replete with numerous compactors and balers wherein a vertical ram compacts material within a compactor or baling chamber. For waste compactors these machines are often manually fed. That is, cardboard boxes and the like are often placed into the compaction chamber manually. Little experience was necessary to determine that the operator of these devices needed guard screens and doors placed thereon to prevent entanglement and injury in the compactors. Even with the advent of guards and interlocks, however, there persists a number of operators who have managed to overcome the safety features of the compactor and thus have received injury. In the past, such injuries have commonly been occasioned by the operator opening the guard door to adjust the material or add to the material after he has actuated the ram sequence. In other situations, the safety interlocks have required numerous coincident switch closures and the operators have shortwired these to avoid closing all of the protective doors and guards. Accordingly, there exists a need for an interlock and guard door which provides greater protection to the user of the machinery.

SUMMARY OF THE INVENTION

The primary object of the present invention is to enhance the safety of the worker utilizing a manually fed baler or compactor.

It is an ancillary object of the present invention to provide a compactor with a simplified interlock system that will facilitate the operator's compliance with proper safety procedures.

Still another object of the invention is to provide a guard mechanism that cannot be opened during the compaction stroke of the compactor.

These and other objects and advantages are accomplished in my novel door mechanism which uses a single sensor to determine whether the chamber door and guard door are properly positioned to enable the ram. Further, positioning the guard door to enable the ram engages a latch mechanism which prevents raising the guard door until the ram has completed its compaction stroke and returned to its retracted position. The foregoing is accomplished by the use of a compaction chamber door which moves relative to the face of the compacted material to permit removal of the bale. The movement may be a pivotal movement on a hinge along an edge of the door or may be a lateral movement along a track parallel to the face of the compaction chamber. The guard door typically moves vertically between a raised open position and a lowered closed position. When the guard door is in its lowered position a latch mechanism engages the compactor door only at the closed position thereof. The guard door is biased toward disengagement, thus it will automatically rise to the open position if the latch does not engage. The sensor which disables the ram requires the guard door to be adjacent the closed compaction chamber door to trip a magnetic switch or the like. Thus any time either the chamber door or guard door is not closed the ram is inoperative.

BRIEF DESCRIPTION OF THE DRAWINGS

Apparatus embodying features of my invention are depicted in the accompanying drawings which form a portion of this disclosure and wherein:

FIG. 2 is a front elevational view of the compactor with the chamber door and guard door closed;

FIG. 3 is a partial sectional view along line 3—3 of FIG. 2 with the doors closed;

FIG. 4 is a partial sectional view as in FIG. 3 with the doors opened; and

FIG. 5 is a detail side view of the latch mechanism with the doors shown in section.

DESCRIPTION OF A PREFERRED EMBODIMENT

Figure 1:
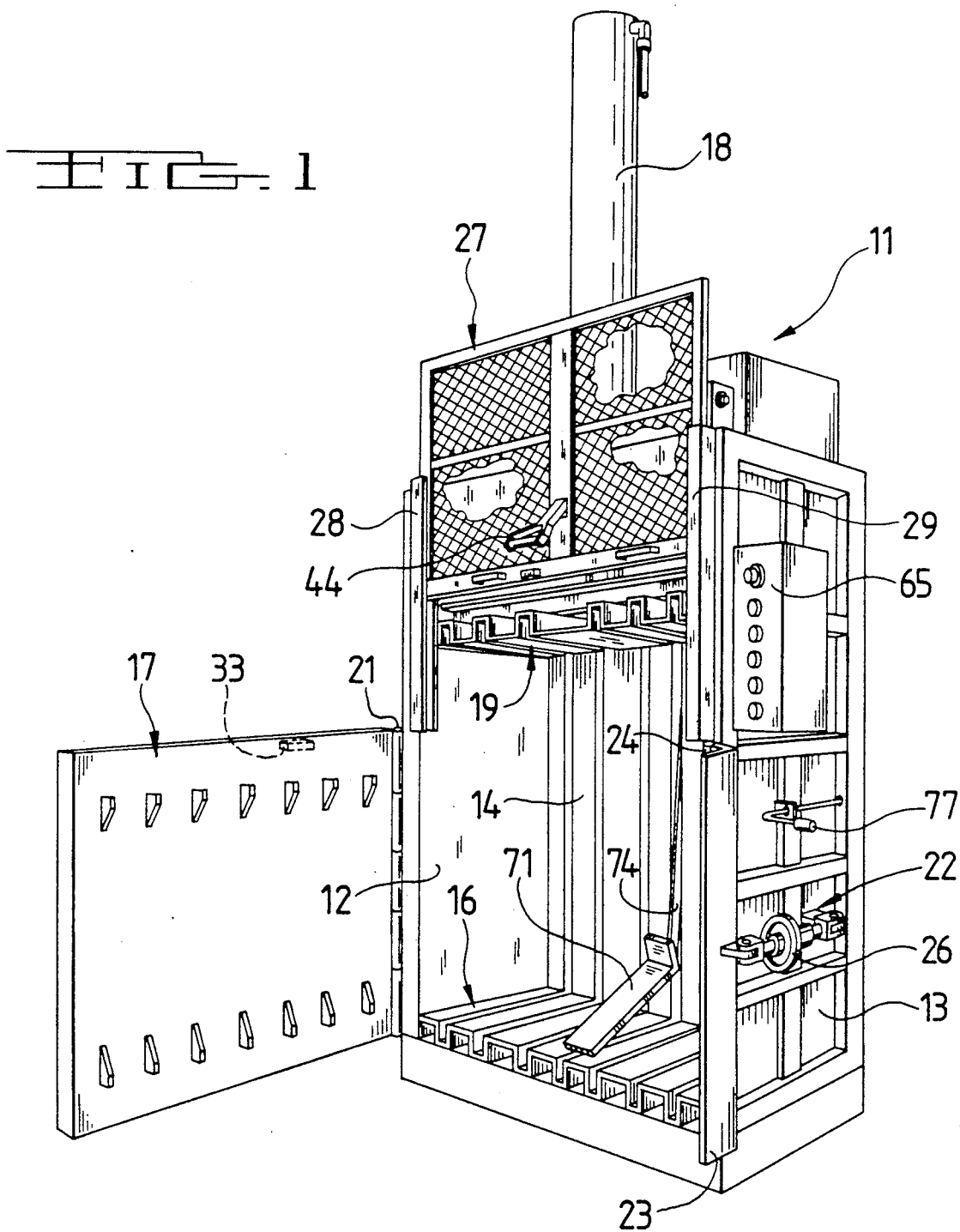
FIG. 1 is a perspective view of a compactor with its chamber door open and guard door raised.

Referring to the drawings for a clearer understanding of the invention, it will be noted that FIGS. 1-4 depict a compactor mechanism incorporating the present invention and show generally a vertically oriented assembly 11 including a pair of sidewalls 12 & 13 a rear wall 14 and a bottom platen 16, which cooperate with a chamber door 17 to form a compaction chamber. The sidewalls 12, 13 and rear wall 14 extend vertically above the chamber door 17 and are integrated with the support for a fluid activated ram 18 which selectively drives a platen 19 on a compaction and retraction stroke within the compaction chamber. The chamber door 17 is hingedly mounted at 21 to the assembly 11 and can be secured in its closed position by a hydraulic latch 22 which includes an angle member 23 hingedly mounted to assembly 11 at 24 in opposition to the chamber door 17. A linear actuator 26 is mounted to the angle member 23 and the assembly 11 to selectively rotate the angle member 23 on the hinge 24 to capture or release door 17.

Mounted above the chamber door 17 is a vertically movable guard door 27 which travels within a pair of opposed guide channels 28 and 29 mounted to the assembly 11. As may be seen in FIG. 3 the guard door 27 is biased toward a raised position by a pulley and weight combination 31 such that the guard door 27 is normally in an open position.

The interaction between the chamber door 17 and the guard door 27 is best seen in FIGS. 3-5. In FIG. 5 note that the upper portion of chamber door 17 has affixed thereto a strike plate 32 on the inside thereof and a magnetic switch 33 on the outside thereof. The magnetic switch 33 is a normally open switch and is connected via leads 34 to the electrical control circuit of the ram 18 (not shown) and is conventionally connected so as to disable the ram 18 as long as the switch 33 remains open. The guard door 27 has affixed to its outer lower periphery a magnet 30 which, when brought into proximity to the switch 33, will close the switch thus enabling the ram 18. Note that since the guard door 27 is biased upwardly, it must be held down adjacent the chamber door 17 to maintain switch 33 in a closed position. To that end, a latch mechanism 35 is provided on the rear side of guard door 27.

As seen most clearly in FIG. 5 a channel member 36 is affixed to the rear of the guard door 27 and opens rearwardly. A latch plate 37 is supported by the channel 36 on a pin 38 which defines a horizontal axis of rotation for the latch plate 37. The latch plate 37 has a forwardly opening latch slot 39 formed therein to receive the strike plate 32 therewithin. Immediately below the latch slot 39 the latch plate 37 forms a cam surface 41 inclined rearwardly such that the strike plate 32 does not arrest downward movement of the latch plate 37. The latch plate 37 is eccentrically mounted on the pin 38 such that gravity urges the slot 39 toward the strike plate 32. A release dog or tab 42 is formed on the latch plate 37 at the upper corner thereof diagonally opposed from the slot 39. The tab 42 extends rearwardly of the remainder of the latch plate 37. A second pin 43 is supported by the channel 36 at a height above pin 38. A handle 44 is mounted on pin 43 and extends through an opening 46 in the channel 36 and guard door 27. Affixed to the handle 44 on either side thereof are a pair of vertically oriented keepers 47 and 48, which accordingly abut the forward edges of a pair of actuator slide plates 51 and 52 spaced apart to receive therebetween a vertically extending actuator arm 55 affixed to the upper portion thereof and to receive the release tab between the lower portion thereof. The slide plates also support an actuator pin 53 and a biasing pin 54. The actuator pin 53 is positioned below release tab 42. The slide plates 51 and 52 are supported on second pin 43 which extends through a pair of vertically oriented slots 56 near the forward edge of the slide plates 51 and 52. Pin 54 is located near the rear edge of the slide plates and approximately at the height of the bottom of slots 56. A biasing spring 57 is connected to pins 54 and 38 such that the strike plates 51 and 52 are normally urged clockwise about second pin 43; however, rotation is arrested by the abutment of slide plates 51 and 52 against the keepers 47 and 48 which urge the handle 44 against the top of opening 46.

The actuator arm 55 terminates in a rearwardly protruding hook 58 which extends to within the stroke of the platen 19. Thus, platen 19 is provided with an opening 61 as shown in FIGS. 3, 4, and 5 with a hinged cover 62 cooperatively positioned thereover. As the platen passes downwardly past the hook 58 the hinged cover 62 allows the hook to pass through the opening 61.

The foregoing description should enable a precise understanding of the operation. As will be understood the chamber with compactor door 17 closed and guard door 22 open serves as a receptacle for material, such as cardboard boxes or paper, to be compacted and baled. The material is deposited into the chamber by passing it over the top of chamber door 17 and beneath the raised guard door 27. With the doors in this position the ram 18 is disabled and a user can safely place material in the compaction compartment to a level at which the ram should be operated. When the desired level of material is in the compartment, the user pulls down on the handle 44. The handle pivots slightly about pin 43 causing the keepers 47 and 48 to rotate the slide plates 51 and 52 counter-clockwise such that the actuator arm 55 and hook 58 move forwardly out of the line of travel of the platen 19. Simultaneously the guard door 27 is downwardly overcoming the bias of the pulley and weight mechanism 31. As the guard door 27 is brought into abutment with the top of the chamber door 17 latch plate 37 engages strike plate 32 within slot 39. Once so engaged latch plate 37 is unaffected by external force applied to handle 44 or guard door 27. Thus, the user cannot manually raise the guard door 27 with the chamber door 19 in the closed position.

With both doors in the closed position the operator may activate the ram from the control panel 65 and compress the material within the chamber. As the ram 18 urges the platen 19 downwardly the hook 58 passes through the opening 61 as shown FIG. 5 and the cover 62 falls to rest atop the platen. Upon retraction of the platen, hook 58 engages the cover 62 and thus actuator arm 55 and the slide plates 51 and 52 are urged upwardly with the platen 19. As the slide plates 51 and 52 move upwardly the activator pin 53 engages the release tab 44 and causes the latch plate 37 to rotate about pin 38 to disengage the slot 39 from strike plate 32. When the latch plate 37 is disengaged the weight and pulley 31 cause the door 27 to rise to its open position, whereupon the magnetic interaction with switch 33 opens and the ram is again disabled and stopped. Note that the length of the actuator arm 55 must be sufficient to allow the platen 19 to retract to its normal rest position before the cover 62 engages the hook 58. Additional material may be placed in the chamber and the operation of the ram repeated as hereinabove until a bale of material is made up within the chamber.

Once the bale of material is made up it may be secured with ties or straps in any manner well-known in the art, preferably by passing the ties around the bale in slots 67 found in the compaction chamber rear wall and door. Ejection of the bale may be accomplished using the ejector linkage shown in FIG. 4, wherein a kicker bar 71 is horizontally mounted to the bottom platen 16 in a recessed position to allow the bale to be formed. An extension 72 on the kicker bar 71 passes through a slot 73 in the back rear wall 14 of the chamber and is hingedly connected to a rigid lift arm 74, which terminates in a hook 76. A side mounted handle 77 is operable to position the hook 76 internally or externally of the chamber. When the bale has been formed and strapped, the hook 76 may be positioned above the platen 19 to engage the platen as it rises and lift the kicker bar 71 to eject the bale through the open chamber door 17. Note that only when the chamber door has been opened and ejection is desired can the ram be moved with the magnetic switch in an open condition.

While I have shown my invention in one form, it will be obvious to those skilled in the art that it is not so limited but is susceptible of various changes and modifications without departing from the spirit thereof.

What I claim is:

1. In a compacting baler having a baling chamber defined by a continuous plate bottom member, opposed side walls affixed to said bottom member and a slotted rear wall, and an overhead ram selectively driving a reciprocating platen within said chamber, an improved door apparatus comprising:

a.) a compaction chamber door mounted to one sidewall by a vertical hinge and selectively movable about said hinge to an open and closed position;

b.) a guard door slidably mounted above said chamber door and aligned with said chamber door when in the closed position thereof and selectively movable between a raised open position and a lowered closed position abutting said chamber door;

c.) a switch electrically connected to said ram to disable said ram when said switch is in a normally open position, said switch being mounted to the upper portion of said chamber door;

d.) a switch actuator cooperatively positioned on the lower portion of said guard door to cause closure of said switch when said guard door abuts said chamber door; and e.) latch means for preventing the opening of said guard door during the downstroke of said ram.

2. Apparatus as defined in claim 1 wherein said switch is magnetically actuated.

3. In a compacting baler having a baling chamber defined by a continuous plate bottom member, opposed side walls affixed to said bottom member and a slotted rear wall, and an overhead ram selectively driving a reciprocating platen within said chamber, an improved door apparatus comprising:

a.) a compaction chamber door mounted to one sidewall by a vertical hinge and selectively movable about said hinge to an open and closed position;

b.) a guard door slidably mounted above said chamber door and aligned with said chamber door when in the closed position thereof and selectively movable between a raised open position and a lowered closed position abutting said chamber door;

c.) interlock means for preventing a downstroke of the ram when said guard door is displaced from said chamber door; and d.) a latch means including a latch striker affixed to the top of said chamber door; a latch hook having a slot therein for receiving said latch striker therewithin and mounted to said guard door for pivotal motion about a horizontal axis, said latch hook having a release dog extending therefrom counter to said slot; and an actuator slidably mounted to said guard door for limited relative vertical movement and having a lower member cooperatively positional to engage said release dog upon upward sliding movement of said actuator and means for engaging a platen on the upstroke thereof.

4. Apparatus as defined in claim 3 wherein said latch hook comprises:

a.) a body portion including a lower portion forming a downward and rearwardly inclined cam surface extending beneath said slot and having an aperture therethrough eccentrically positioned such that the weight of said body portion urges said slot toward said latch strike, with said release dog being formed at the top of said body portion such that upward force thereon causes said body portion to rotate on a shaft extending through said aperture to retract said body portion from said latch strikes.

5. Apparatus as defined in claim 4 wherein said actuator comprises:

a.) first and second parallel slide plates, spaced apart to receive said release dog therebetween and supporting said lower member at a height beneath said release dog, said plates having aligned vertical slots formed therein near an upper forward corner thereof with said vertical slots receiving therethrough a pin-like member affixed to said guard door;

b.) a vertically extending member affixed between said slide plates and extending upwardly therefrom a predetermined distance; and c.) a terminal hook affixed to the top of said vertically extending member and extending rearwardly into the path of travel of said platen said platen having a slot therein to admit upward passage of said terminal end therethrough and a member affixed thereon to prevent downward passage thereof therethrough.

6. Apparatus as defined in claim 5 further comprising at least one spring-like member biasing said slide plates downward.

7. Apparatus as defined in claim 6 wherein said slide plates are pivotally mounted and are attached to a handle, extending outwardly from said guard door, operatively connected to pivot said actuator hook forwardly away from said platen as said door is closed.

8. Apparatus as defined in claim 3 further comprising means connected to said guard door for raising said guard door responsive to disengagement of said latch hook from said latch strike.

9. In a compacting baler having a baling chamber defined by a continuous plate bottom member, opposed sidewalls affixed to said bottom member and a slotted rear wall, and an overhead ram selectively driving a reciprocating platen within said chamber, an improved door apparatus comprising:

a.) a compaction chamber door mounted to one sidewall by a vertical hinge and selectively movable about said hinge to an open and closed position;

b.) a guard door slidably mounted above said chamber door and aligned with said chamber door when in the closed position thereof and selectively movable between a raised open position and a lowered closed position abutting the upper edge of said chamber door;

c.) a switch electrically connected to said ram to disable said ram when said switch is in a normally open position, said switch being mounted to the upper portion of said chamber door;

d.) a switch actuator cooperatively positioned on the lower portion of said guard door to cause closure of said switch when said guard door abuts said chamber door;

e.) a pair of spaced apart slide plates having aligned vertical slots herein with said slots receiving therein a horizontally disposed bar extending between opposed side of said bracket-like member; said slide plates being joined proximal the bottom thereof by a bolt;

f.) a latch hook, pivotally mounted between opposed sides of said bracket-like member having a forwardly opening groove for engaging a portion of said chamber door therewithin; and having a releasing dog extending upwardly and rearwardly intermediate said slide plates above said bolt;

g.) an actuator affixed between said slide plates and extending upwardly therefrom to engage said platen on an upward stroke thereof; and h.) a handle, extending forwardly from said guard door, being pivotally mounted to said bar intermediate said slide plates and operatively engaging said slide plates for concomitant angular motion about said bar.

10. Apparatus as defined in claim 9 further comprising a pair of contact elements affixed to said handle proximal said slide plates such that angular motion of said handle toward said slide plates urges said contact elements against said strike plate.

11. Apparatus as defined in claim 9 wherein said latch hook is eccentrically mounted such that the weight thereof urges said forwardly opening groove toward engagement with said chamber door and wherein a cam surface is formed on said latch hook subjacent said grooves whereby said latch hook may be displaced laterally to facilitate engagement of said chamber door in said groove as said guard door moves to a closed portion.

12. Apparatus as defined in claim 9 further comprising means for automatically raising said guard door upon disengagement of said latch hook from said chamber door.

13. Interlock apparatus for use with a compacting device having a controllable vertically reciprocal ram for moving a platen on an upstroke and a compacting downstroke during a compacting cycle comprising:

a.) a chamber door pivotally mounted to provide closure to a baling chamber;

b.) a guard door mounted for selective vertical motion toward a closed position and away from said chamber door to an open position;

c.) latch means carried by said guard door and engageable with said chamber door to secure said guard door thereto during the downstroke of said platen, said latch means being releasable by engagement with said platen on the upstrokes thereof; and d.) sensing means for determining the relative position of said chamber door and said guard door having an output to disable said ram when said guard door is in an open position.

14. Apparatus as defined in claim 13 wherein said latch means comprises a pivotally mounted latch hook adapted to engage said chamber door; a vertically movable actuator operatively positioned to disengage said latch hook upon upward movement of said ram; and means for urging said actuator about a pivot point independently of said latch hook to reset said ram.

* * * * *